United States Patent [19]

Lewis

[11] 3,922,001
[45] Nov. 25, 1975

[54] INFLATION TIME CONTROL FOR SAFETY DEVICE

[75] Inventor: Donald J. Lewis, Troy, Mich.

[73] Assignee: Allied Chemical Corporation, New York, N.Y.

[22] Filed: Oct. 27, 1971

[21] Appl. No.: 192,850

[52] U.S. Cl. ......... 280/150 AB; 180/105; 340/52 D
[51] Int. Cl.² .......................................... B60R 21/08
[58] Field of Search ...... 280/150 AB; 180/105, 103; 340/61, 62, 71, 52 D

[56] References Cited
UNITED STATES PATENTS

| | | | |
|---|---|---|---|
| 2,350,390 | 6/1944 | Critchfield et al. | 340/62 |
| 2,474,610 | 6/1949 | Wunsch | 340/71 X |
| 3,154,168 | 10/1964 | Wilmot | 180/103 |
| 3,157,854 | 11/1964 | Riley | 200/61.45 R X |
| 3,332,060 | 7/1967 | Liljequist | 200/61.45 R |
| 3,582,107 | 6/1971 | Goetz | 280/150 AB |
| 3,606,377 | 9/1971 | Martin | 280/150 AB |
| 3,635,306 | 1/1972 | Davis | 340/62 |
| 3,639,896 | 2/1972 | Bozoian | 340/62 |
| 3,663,035 | 5/1972 | Norton | 280/150 AB |
| 3,674,059 | 7/1972 | Stephenson | 280/150 AB |

Primary Examiner—Leo Friaglia
Assistant Examiner—John P. Silverstrim
Attorney, Agent, or Firm—Jonathan Plaut; Ernest D. Buff

[57] ABSTRACT

Apparatus for transmitting an electrical current from a power supply to a gas source during a time interval which varies in inverse proportion to the impact velocity of a vehicle in which the apparatus is disposed. A portion of the gas is released from the gas source upon receipt of the electrical pulse. Another portion of the gas is released from the source independently of the pulse. The released gas passes into a bag, which inflates during a time interval determined by the impact velocity of the vehicle, thereby serving to protect occupants or other mobile objects within the vehicle.

22 Claims, 8 Drawing Figures

INVENTOR.
DONALD J. LEWIS
BY
ATTORNEY

INFLATION TIME CONTROL FOR SAFETY DEVICE

BACKGROUND OF THE INVENTION

1. Field of the Invention

This invention relates to an inflation time control adapted for use with a safety device for vehicle passengers, and more particularly to apparatus for inflating a bag with gas, whereby the inflation time is inversely proportionate to the impact velocity of a vehicle within which the bag is disposed. The invention is applicable to systems which utilize stored gas, gas generating materials or hybrid combinations of the same; but, inasmuch as the problem of inflation time control is more prevalent with systems employing gas generating materials, the invention will be described in their connection. Such systems conventionally constitute apparatus for detecting the collision of a vehicle and for delivering gas provided by the evaporation of a non-flammable gas generating material, or from a combination of stored pressurized gas and gas generating material, into a bag at sufficient speed to inflate and dispose the bag between hard portions of the vehicle and passengers or other mobile objects contained therein.

2. Description of the Prior Art

In the prior application of Stephenson, Ser. No. 81,947, filed Oct. 19, 1970, there is disclosed apparatus which has proved effective in the solution of the problem of inflation time control and which, at the same time, has eliminated the disadvantages of prior proposals attempting similar results. According to the said prior disclosure, a gas source, which may comprise a gas generating means and a gas containing means, is electrically connected to apparatus for detecting a collision of a vehicle within which the gas source is disposed. The gas generating means which includes a combustible gas generating material, and the gas containing means, which comprises gas stored under pressure, are each respectively housed within separate compartments of a pressurized tank. A pressure sensitive barrier provides a wall common to the compartments. Apparatus is provided for releasing the stored gas and gas provided by combustion of the gas generating material from the respective compartments. When a vehicle equipped with such apparatus is involved in an impact, an electrical signal is sent from the collision detecting apparatus to the gas source. A mechanism between the collision detecting apparatus and the gas generating means delays transmission of the electrical signal to the gas generating means for a fixed time interval. The electrical signal sent to the gas containing means is not delayed. The electrical signal reaches the apparatus for releasing gas from the gas containing means a fixed time interval before the electrical signal reaches the apparatus for releasing gas from the gas generating means. Gas is sequentially discharged from the gas containing means and from the gas generating means through a conduit and into a shock-absorbing bag or cushion at a temperature and pressure relatively lower than obtains when the gas is simultaneously released from the gas generating and gas containing means.

Prior to the invention disclosed by Stephenson, it had been determined that at relatively low impact velocities a bag inflated during a constant time interval moves in the direction of an occupant within the vehicle at excessively high speeds. An occupant moving forward at the time of impact can be pushed backward with considerable force by the rapidly inflating bag. Increased inflation time intervals provide protection against such rebound problems but reduce the protection afforded during impact at higher velocities. The provision by Stephenson of apparatus for releasing stored gas a fixed time interval before a generating gas is released, while representing a significant advance in the art, has also been found to be in need of improvement in this regard because the number of velocities at which vehicular impact can occur is considerably larger than the time interval during which the bag can be inflated by the apparatus. At certain impact velocities, an inflation assembly such as Stephenson's, which utilizes a fixed time control to inflate an air cushion during a single fixed time interval, can result in inflation time intervals somewhat faster or slower than those best suited to protect the occupant. The protection afforded to an occupant disposed within a vehicle can be significantly increased if, upon impact of the vehicle, the bag inflates during a preselected time interval, calculated as that best suited to protect the occupant. Such an inflation time interval can be correlated with the impact velocity of the vehicle. The instant invention provides an improved apparatus of the Stephenson type wherein the time during which an air cushion is inflated is inversely proportional to the impact velocity of a vehicle within which the air cushion is disposed.

Summary of the Invention

Briefly stated, the invention provides an apparatus for transmitting an electrical current from a power source to a first portion of a gas source within a fixed time interval, and to a second portion of the gas source within a time interval which varies in inverse proportion to the impact velocity of a vehicle in which the apparatus is disposed. An impact detecting means causes the current to pass from the power source to a first and second circuit means upon impact of the vehicle. Part of the current is transmitted through the first circuit means to a first portion of the gas source during a first fixed time interval. Another part of the current is transmitted through the second circuit means to a second portion of the gas source during a second variable time interval. The first and second portions of the gas source each respectively comprise either a gas generating material or a pressurized gas housed within a container, and means for releasing the pressurized gas or gas developed by combustion of the gas generating material from the container upon receipt of the electrical current. Preferably, the first and second portions of the gas source are separated within a pressurized tank by a pressure sensitive barrier. Such barrier forms a wall common to a first and second container in which the first and second gas portions are respectively housed. The second time interval is caused to vary in inverse proportion to the velocity of the vehicle upon impact by a control means connected to the impact detecting means and responsive to the impact velocity of the vehicle. The first time interval remains constant. Gas released from the combined portions of the gas source flows into an inflatable bag during a time interval which is then inversely proportional to the impact velocity of the vehicle.

More specifically, the impact detecting apparatus includes an electroconductive material connected to the power source. Part of the current is caused to flow from the power source to the first circuit means when forces resulting from impact of the vehicle displace the electroconductive material against a preselected resisting force and into contact with an electroconductive member connected to the first circuit means. A control means is additionally provided, which may comprise an electroconductive material connected to the power source and a resistance element connected to the second circuit means. Preferably, both the impact detecting apparatus and the control means are comprised of the same electroconductive material.

Part of the current is caused to flow from the power source to the second circuit means when forces resulting from impact of the vehicle displace the electroconductive material of which the control means is comprised against a preselected resisting force and into contact with the resistance element. The electroconductive material of the control means cooperates with the resistance element to control the time interval during which the electrical current is transmitted from the power source through the second circuit means to the second portion of the gas source. The electrical current is transmitted from the electroconductive material of the impact detecting apparatus through the first circuit means to the first portion of the gas source during a constant time interval which should equal but not exceed the time interval during which the electrical current is transmitted to the second portion of the gas source. Gas is released from the first portion of the gas source upon receipt of the electrical current from the first circuit means. Such release does not cause gas to be released from the second portion of the gas source; such gas is not released until receipt of the electrical current from the second circuit means. The released gas is preferably discharged from the gas source through a conduit and into a shockabsorbing bag or cushion. As the impact velocity of the vehicle increases, the electrical current travels through a correspondingly larger portion of the electroconductive material and through a correspondingly smaller portion of the resistance element. The electrical current thus reaches the second portion of the gas source within a shorter time interval.

A unique means is thereby furnished for variably controlling the time during which an air cushion is inflated. For substantially any impact velocity, the bag can be made to inflate during the time interval best suited to protect the occupant. Since the noise associated with inflation of air cushions of the type described generally increases with increased inflation time intervals; and since, in accordance with the present invention, bags need not be inflated during a time interval faster than that preselected for each impact velocity, it is also possible to reduce the sound resulting from inflation. Accordingly, the invention affords increased protection against sound and rebound problems and, in general, results in a safer disposition of the bag when the vehicle which carries it is involved in a collision.

Brief Description of the Drawings

The invention will be more fully understood and further advantages will become apparent when reference is made to the following detailed description of the preferred embodiment of the invention and the accompanying drawings in which.

Description of the Preferred Embodiment

Figure 1:
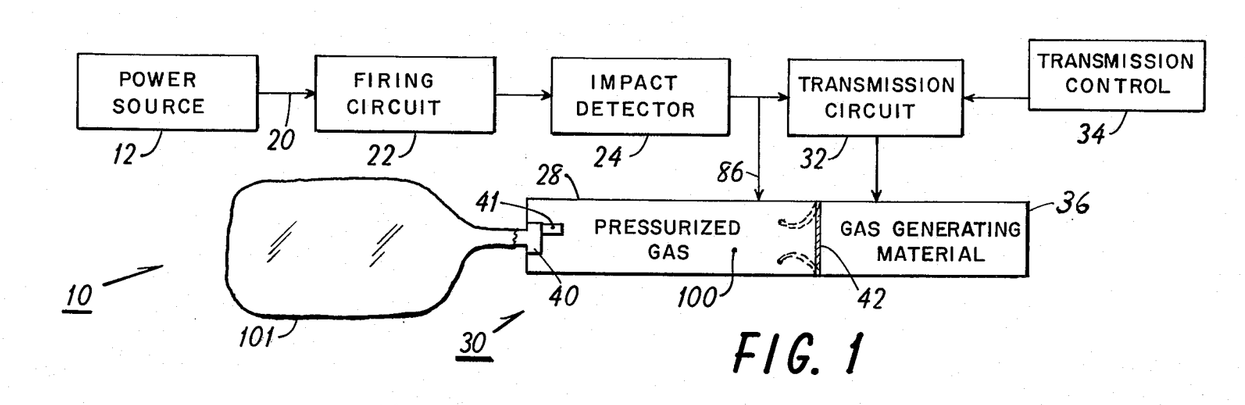
FIG. 1 is a diagrammatic representation of apparatus for transmitting an electrical current to a first portion of a gas source within a fixed time interval, and to a second portion of the gas source within a variable time interval.

Referring to the drawings, there is illustrated in FIG. 1 a preferred form of electrical apparatus for transmitting an electric current to a first portion of a gas source within a fixed time interval and to a second portion of the gas source within a variable time interval. The apparatus, shown generally at 10, includes a power source 12, which may comprise a battery of the type conventionally used in a motor vehicle. An auxiliary power supply, such as a capacitor connected in parallel to the battery, may be used as the power source in the event that the battery is not supplying power to the system. Under normal operating conditions an electrical current 20 flows from the power source 12 through firing circuit 22 and back to the power source 12. When a vehicle in which apparatus 10 is disposed is involved in a collision, impact detector 24 directs current 20 by switch means, shown at 26 in FIG. 2 to a first portion 28 of a gas source, shown generally at 30. The current 20 also passes through transmission circuit 32 to a second portion 36 of gas source 30 during a time interval controlled by transmission control means 34. Thus, current 20 passes from power source 12 to the first and second portions 28 and 36 of the gas source 30 by a first and second circuit means, both of which may include the firing circuit 22 and the impact detector 24. The first circuit means connects the power source 12 to the first portion 28 of gas source 30. The second circuit means connects the power source 12 to the second portion 36 of the gas source 30.

The first and second gas portions of which gas source 30 is comprised may each respectively utilize a gas generating material or a pressurized gas housed within a container, and means for releasing the pressurized gas or gas developed by combustion of the gas generating material from the container upon receipt of the electrical current 20. Thus, the first and second gas portions 28 and 36 of gas source 30 can be comprised of pressurized gas, gas generating materials, or a hybrid combination of the same. In a preferred embodiment of the invention, the gas source 30 utilizes a hybrid combination of pressurized gas and gas generating materials. Nitrogen, air, or other suitable gas which can be stored for prolonged periods without leaking from a gas containing vessel is generally used as the pressurized gas. Black powder, nitrocellulose, composite propellants or other material which generates gas and heat upon combustion can be used as the gas generating material. In the embodiments shown in FIGS. 1, 2, 6 and 7, the first portion 28 of gas source 30 comprises a pressurized gas, and the second portion 36 comprises a gas generating material. A pressure sensitive barrier 42 separates the first portion 28 from the second portion 36 of gas source 30. Gas can be released from the first portion 28 by exploding shape charge 41, upon receipt of the electrical current 20. The explosion of shape charge 41 dislodges plug 40 and creates a conduit in communication with the first portion 28 of gas source 30 and an inflatable bag 101. Gas from the first portion 28 of the gas source 30 flows through the conduit into the inflatable bag 101. When electrical current 20 reaches the second portion 36 of the gas source, combustion of the gas generating material commences. The pressure within the second portion 36 increases to a preselected level, whereupon barrier 42 ruptures, and the gas sequentially flows through the first portion 28 and the conduit into bag 101. The construction and operation of the gas source 30, including the first portion 28, the second portion 36 and apparatus connected thereto for inflating an air cushion is described in copending application Ser. No. 81,947, filed Oct. 19, 1970, which disclosure is specifically incorporated by reference.

Figure 2:
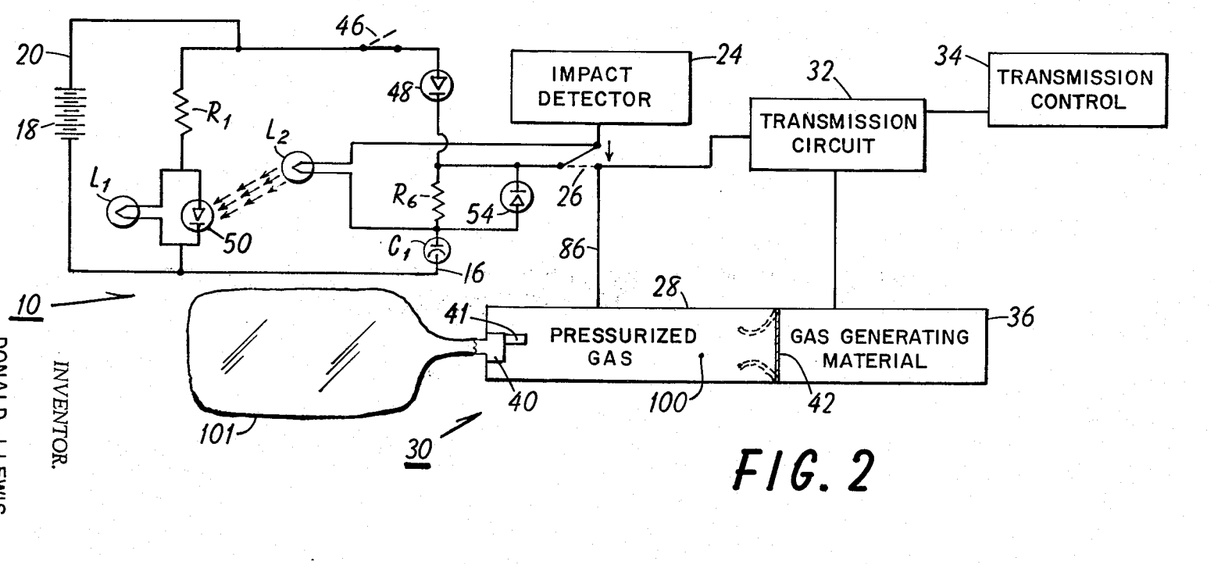
FIG. 2 is a schematic electrical diagram of the firing circuit of FIG. 1.

In FIG. 2 there is illustrated a schematic electrical diagram of the firing circuit of FIG. 1. Upon application of voltage from battery 18, current flows through low pressure switch 46. If the pressure in gas source 30 is decreased to a preselected level, switch 46 opens and current passes through resistor $R_1$ and lamp $L_1$ to battery 18. Lamp $L_1$ goes on, indicating a malfunction within apparatus 10. Normally switch 46 is closed, and current 20 flows through at least one diode 48 to the impact detector 24. The system will, of course, be more reliable if redundant diodes are connected in parallel in place of the single diode 48. Current 20 then passes from impact detector 24 through lamp $L_2$ and capacitor $C_1$. The capacitor $C_1$ becomes charged and can act as an auxiliary power supply to fire an electroexplosive device comprising shape charge 41 within gas source 30, as described in the said copending application Ser. No. 81,947, filed Oct. 19, 1970. Upon impact of a vehicle carrying apparatus 10, the impact detector 24 throws switch 26 in the direction of the arrow. The capacitor $C_1$ discharges through diode 54, causing current 20 to pass through switch 26 to the first portion 28 of the gas source and through transmission circuit 32 to the second portion 36 of the gas source, as described above. The reliability of apparatus 10 can again be increased if redundant diodes are connected in parallel in place of diode 54.

Diodes 48 function to prevent an external short circuit resulting from a collision, for example, from discharging capacitor $C_1$ through low pressure switch 46. In the event that current reaches line 16 but does not initially pass through and charge capacitor $C_1$, lamp $L_2$ goes on and remains on to indicate failure of the auxiliary power supply. If current 20 from low pressure switch 46 is prevented from reaching capacitor $C_1$ by a break in the line to $C_1$, for example, lamp $L_1$ comes on and remains on to indicate that failure.

Generally, capacitor $C_1$ is quickly charged; and thus, lamp $L_2$ will come on for no longer than about 5 seconds. Light from lamp $L_2$ is transferred to light activated switch 50. The resistance of switch 50, which was previously higher than that of lamp $L_1$, is reduced upon receipt of light from lamp $L_2$ to a resistance level below that of lamp $L_1$. Accordingly, current 20 passes through switch 50 instead of lamp $L_1$, absent some malfunction in the apparatus 10.

Figures 3, 4:
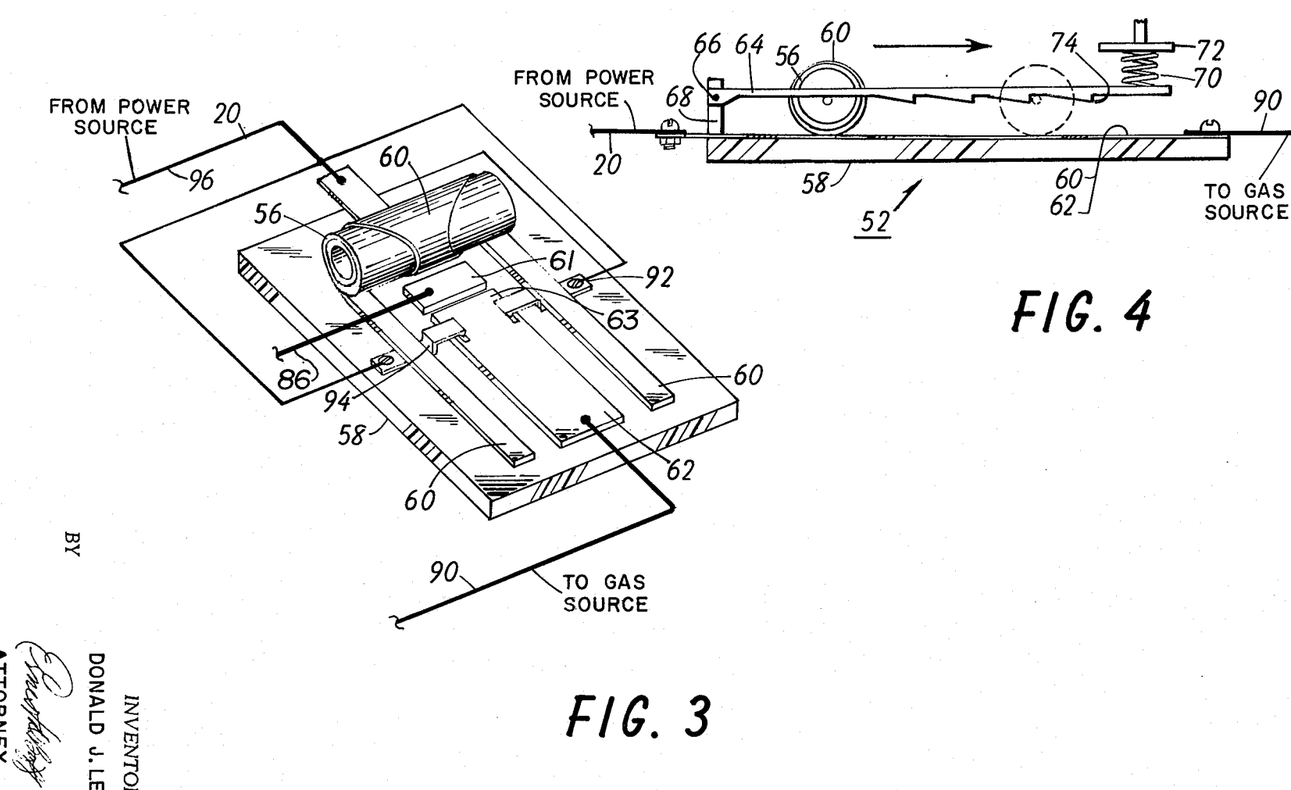
FIG. 3 is an isometric view of the impact detector and transmission control of FIGS. 1 and 2, including an electrically conductive material and a resistance element.
FIG. 4 is a side view of a means for providing a constant level of resistance throughout the time during which an electrical pulse is transmitted through the time control apparatus of the present invention.

In FIG. 3 there is illustrated the impact detection and transmission control means of FIGS. 1 and 2. Such means may comprise at least one roller 56 of metal such as stainless steel, gold plated copper, or other suitable conductive material. The roller 56 is electrically connected to the power source 12 and moveably mounted on a nonconductive support 58 made, for example of plastic, lexon, polycarbonate, glass or ceramics. A thin band of electrically conductive material 60, such as stainless steel, gold plated copper, or the like, wrapped around roller 56 and spot welded or otherwise secured to support 58, provides a resisting force against which the roller 56 acts. Resistance element 62, comprised of a deposited carbon film or other material that will provide a suitable value of resistivity, is fixedly mounted on support 58 for contact with the roller 56. The resistance element is electrically connected to the second portion 36 of the gas source 30. An electroconductive member 61 comprised of a suitable electroconductive material is fixedly mounted on the support 58 adjacent end 63 of resistance element 62, for contact with the roller 56. The electroconductive member 61 is electrically connected to the first portion 28 of gas source 30 through line 86. As roller 56 is displaced along the surface of platform 58 in the direction of the arrow, band 60 is brought into contact with the electroconductive member 61 and then an increasing portion of resistance element 62. Due to the resisting force provided against roller 56 by band 60, the displacement distance of roller 56 can be made directly proportional to the deceleration time product created at impact of a vehicle carrying apparatus 10. As the impact velocity is increased, roller 56 is displaced further along support 58 in the direction of the arrow. The electrical current 20 from firing circuit 22 passes through a correspondingly larger portion of electrically conductive material 60, and through a correspondingly smaller portion of the resistance element 62. Accordingly, the time interval during which the electrical current 20 travels from firing circuit 22 through impact detector 24, transmission control 34, and transmission circuit 32 to the second portion 36 of gas source 30 decreases.

It will be understood that current 20 from firing circuit 22 which is directed by impact detector 24 through line 86 to the first portion 28 of gas source 30 is not delayed in the above manner. Thus, at lower impact velocities gas is released from first portion 28 before gas is released from second portion 36, and the air cushion inflates during a longer time interval than obtains if gas is simultaneously released from the first and second portions 28 and 36 of gas source 30. The same result can be achieved if the first and second portions 28 and 36 of gas source 30 each comprise pressurized gas within a gas containing vessel; or alternatively, gas generating material within a vessel having means to promote the combustion thereof upon receipt of the electrical current 20. The time interval between release of gas from the first portion 28 and the second portion 36 of gas source 30 is, in effect, the time during which current 20 passes from firing circuit 22 through impact detector 24, and transmission circuit 32 to gas source 30. Transmission control means 34 can be employed to make that time interval vary in direct proportion to the impact velocity of a vehicle carrying apparatus 10. As long as gas source 30 comprises a first gas portion 28 which can be released, as described, independently of a second gas portion 36, the air cushion can be inflated during a preselected time interval which varies for each of a relatively wide range of impact velocities. In a preferred embodiment of the invention, such velocities may range from about 5 miles per hour to about 50 miles per hour.

In FIG. 4 there is illustrated a restraining element for locking the roller 56 in a position along support 58 to which the roller 56 has been displaced by impact of a vehicle carrying apparatus 10. The restraining element, shown generally at 52, includes a roller 56, moveably mounted, as above, between member 64 and support 58. Pin 66 pivotally secures one end of member 64 to auxiliary support 68. The other end of member 64 is attached to spring 70, which cooperates with spring support 72 and pin 66 to apply pressure to member 64 and hold the member in a position substantially parallel with support 58. Member 64 may comprise wood, plastic, metal or other materials which have sufficient strength and rigidity to direct roller 56 along support 58. Upon impact of a vehicle in which apparatus 10 is disposed, roller 56 is displaced in the direction of the arrow along support 58. When the force exerted on roller 56 by band 60 becomes greater than the force exerted on roller 56 by impact of the vehicle, the roller 56 will no longer be displaced in the direction of the arrow, but will normally commence to move along support 58 in the opposite direction. Ratchets 74 permit roller 56 to move in the direction of the arrow but prevent movement of roller 56 toward auxiliary support 68. Accordingly, roller 56 is locked by ratchets 74 in the forward position of displacement; a substantially constant resistance can be provided throughout the time delay cycle. The apparatus used to achieve such constant level of resistance will naturally depend on the length of the transmission time delay desired and on the dynamics of roller movement during the delay. Where the time interval during which current 20 passes from firing circuit 22 through impact detector 24, transmission control 34 and transmission circuit 32 to the second portion 36 of the gas source 30 is less than 40 milliseconds; for example, the restraining element may not be necessary.

Figure 5:
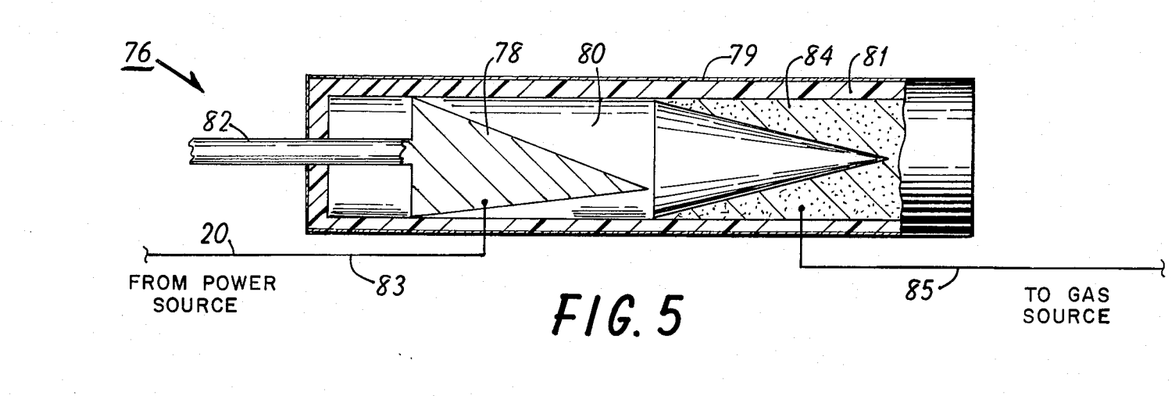
FIG. 5 is a side view partially in section of an alternate form of transmission control apparatus for use with the present invention.

An alternate means for the variable transmission of an electrical pulse to a gas source is illustrated in FIG. 5. The unit, shown generally at 76, is of tubular shape, although other forms which operate in a similar manner can be used. Cone shaped member 78 is slideably moved within hollow compartment 80 by forces exerted on shaft 82 during impact of a vehicle in which apparatus 10 is disposed. The cone 78 is constructed of an electrically conductive material of the type used to make band 60. Concave member 84 is constructed of a material 87 which resists passage of electrical current 20 to a greater extent than does the material from which cone 78 is constructed. Lead wire 83 connects cone 78 to power source 12, while lead wire 85 connects concave member 84 to transmission circuit 32. Both the cone 78 and the concave member 84 are separated from casing 79 by insulation 81 comprised of plastic or other suitable nonconductive material. Unit 76 is fixedly mounted in the vehicle so that cone 78 is displaced within compartment 80 for a distance determined by the movement of shaft 82 during compression of the vehicle. Inasmuch as the distance that the front of a motor vehicle is compressed will increase as the impact velocity is increased, the displacement distance of shaft 82 and cone 78 can be made directly proportional to the impact velocity of a vehicle in which apparatus 10 is disposed. The longest time interval during which current 20 passes from power source 12 through the transmission circuit 32 to the gas source, will occur when cone 78 contacts the smallest portion of concave member 84. As the impact velocity is increased, cone 78 is displaced further within hollow compartment 80 in the direction of concave member 84, and is brought into contact with a correspondingly larger portion of the less conductive material from which concave member 84 is constructed. The electrical current or pulse 20 from firing circuit 22 passes through the electrically conductive material 60 of cone 78 before entering concave member 84 and therefore passes through a correspondingly smaller portion of the less conductive material of concave member 84. Accordingly, the time interval during which current 20 is transmitted through the variable time control apparatus of the present invention is decreased.

Figure 6:
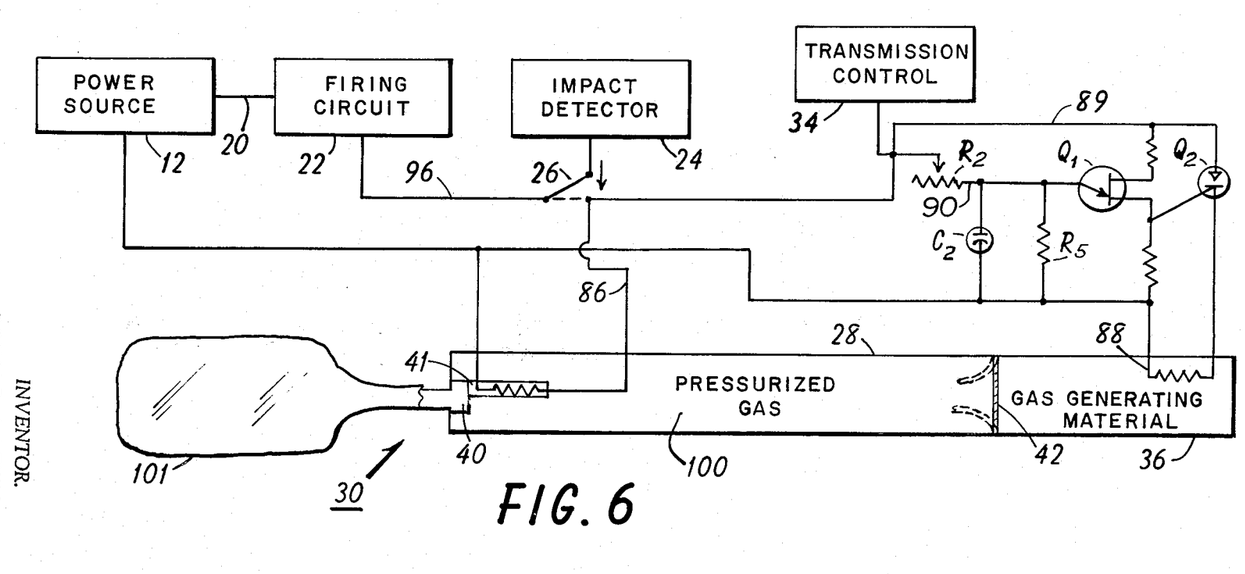
FIG. 6 is a schematic electrical diagram of an electronic means for controlling the time during which an electrical pulse is transmitted from the impact detector to the gas source.

In FIG. 6 there is shown, schematically, an electrical diagram of an electronic means for controlling the time during which an electrical current 20 is transmitted from the firing circuit 22 to the gas source 30. Current 20 from power source 12 and firing circuit 22 passes through switch 26, which is thrown by impact detector 24. Part of current 20 then passes through line 86 directly to the first portion 28 of gas source 30. Another part of current 20 travels through a portion of variable resistor $R_2$, charging capacitor $C_2$. When the peak point of unijunction transistor $Q_1$ is reached, the current 20 is emitted from the unijunction transistor $Q_1$ in the form of an electrical pulse. Such pulse produces a voltage at the gate of silicon controlled rectifier $Q_2$, which allows current 20 to flow through line 89 and silicon controlled rectifier $Q_2$ to bridge wire 88 within the second portion 36 of gas source 30.

The time interval during which current 20 is allowed to pass through the transmission circuit 32 to gas source 30 is directly proportional to the resistance value of the variable resistor $R_2$. Since that value is determined by the transmission control means 34, gas can be released from the gas source 30 during a preselected time interval which varies in inverse proportion to the impact velocity of a vehicle in which apparatus 10 is disposed.

Figure 7:
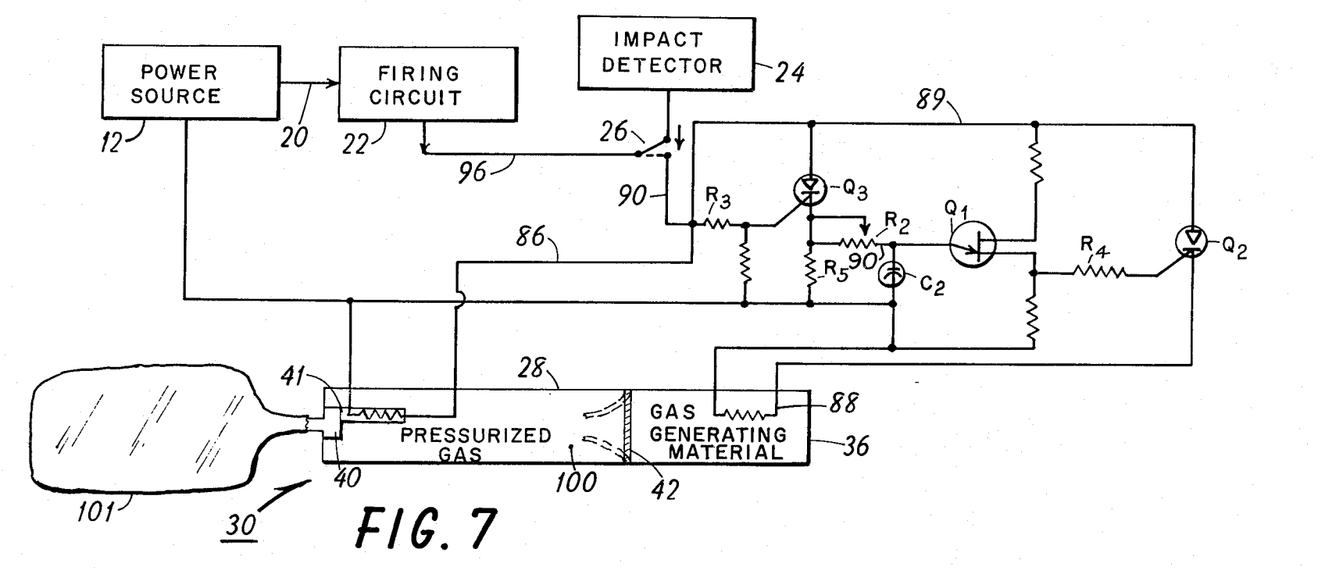
FIG. 7 is a schematic electrical diagram of an alternate electronic means for controlling the time during which an electrical pulse is transmitted from an impact detector to the gas source.

The schematic electrical diagram shown in FIG. 7 shows an alternate means for changing the time interval during which an electrical current passes from a power source to a preselected portion of a gas source. As illustrated, current 20 from power source 12 travels through firing circuit 22 and switch 26 thrown by impact detector 24. Part of current 20 passes through line 86 directly to the first portion 28 of gas source 30. As noted above, portion 28 may comprise either a pressurized gas or a gas generating material. Another part of the current 20 then passes through resistor $R_3$, silicon controlled rectifier $Q_3$ and variable resistor $R_2$, charging capacitor $C_2$ until the peak point of unijunction transistor $Q_1$ is reached, current 20 is emitted from the unijunction transistor $Q_1$ in the form of an electrical pulse, which passes through resistor $R_4$ to silicon controlled rectifier $Q_2$. The system then functions in the same manner as if the circuit of FIG. 6 were employed with the exception that in FIG. 7 the time interval during which current 20 passes through switch 26 to line 90 need not be of at least the same duration as the time interval during which current 20 passes from switch 26 through the transmission time delay apparatus to the second portion 36 of gas source 30.

Resistors $R_3$ and $R_4$ limit current passing through the gates of silicon controlled rectifiers $Q_3$ and $Q_2$, respectively. Resistor $R_5$ functions to bleed down capacitor $C_2$ during shutdown when power is not supplied to apparatus 10 by source 12.

The apparatus 10 which has been disclosed herein can, of course, be modified in numerous ways without departing from the scope of my invention. In one aspect of the invention, for example, a plurality of control elements each comprising a moveable electroconductive material such as roller 56 or cone 78 connected to the power source 30 could be individually displaced against a plurality of preselected resisting forces. The resisting force against which each unit is displaced could be varied throughout a preselected range. A unit upon which sufficient force is exerted to overcome the resisting force could be caused to move into contact with an element having a preselected resistance value. Units displaced against higher resisting forces would contact elements having correspondingly lower resistance values. In another aspect of the invention a plurality of control elements each comprising a moveable electroconductive material and a resistance element having a constant resistance value could be displaced against a constant resisting force, as described in connection with FIG. 3, to provide additional reliability. It should be apparent that the firing circuit could be simplified by eliminating resistor $R_1$, low pressure switch 46, light activated switch 50 and lamps $L_1$ and $L_2$, although the latter circuit would be less reliable. Similar modifications could be made with respect to the power source 12, impact detector 24, transmission circuit 32 and gas source 30. For this reason, the apparatus 10 has been indicated diagrammatically by block-units in FIG. 1. Additional modifications of the transmission control apparatus 34 which change or control the time interval during which current 20 passes from power source 12 to gas source 30 are possible. As shown in FIG. 3, for example, switches 92 and 94 can be mounted on platform 58 below roller 56. Upon contact with roller 56, the switches can be pressed down to connect line 96 with line 90 for a preselected time interval of longer duration than the time interval during which current 20 passes through transmission circuit 32 to power source 30. Accordingly, in this embodiment, the time interval during which current 20 passes from line 96 to line 90 will be of at least the same duration as the time interval during which current 20 passes from line 96 through the transmission circuit 32 to gas source 30, even if the circuit of FIG. 6 is employed. Such modifications are intended to fall within the scope of my invention as defined by the subjoined claims.

Figure 8:
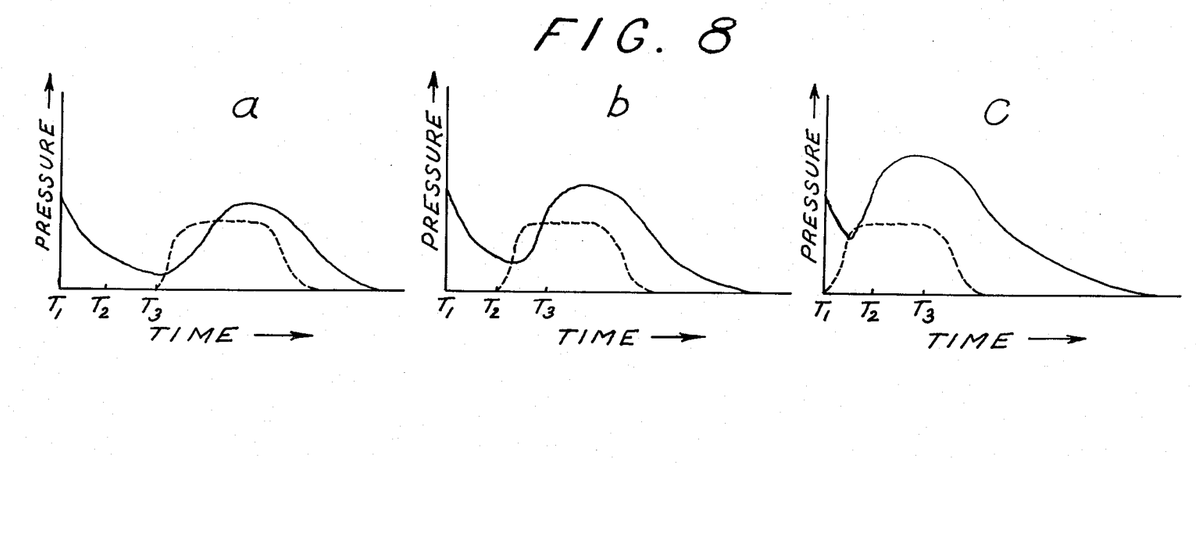
FIG. 8 illustrates the pressure of gas within preselected portions of a gas source as a function of time after impact.

Referring to FIG. 8, the gas pressure in the first portion 28 and in the second portion 36 of gas source 30 is shown as a function of time after impact. The impact occurs at time $T_1$. Plug 40 is removed by means described in the said prior application, and a conduit, or an outlet, is thereby created in the gas containing means 38 at time $T_1$, whereby stored gas 100 starts to flow from the first portion 28 of gas source 30 through the conduit or outlet and into an inflatable bag 101. A second gas 98, generated by combustion of pyrotechnic material, enters the first portion 28 of gas source 30 at times $T_3$, $T_2$ and $T_1$, as shown in FIG. 8a, 8b and 8c, respectively.

The pressure of stored gas within gas containing means 38 is increased by contact with generated gas 98, which is generally at a higher temperature and pressure than the stored gas. Such contact occurs when gas 98, generated by combustion within the second portion 36 of gas source 30 reaches a pressure sufficient to rupture barrier 41. The barrier 41 is removed to create an inlet to the first portion 28 of gas source 30. Gas 98 passes through the inlet and mixes with a portion of the pressurized gas 100 within the first portion 28 of gas source 30. In FIG. 8a the pressure within the first portion 28 of the gas source 30 is reduced initially as the stored gas passes through the outlet of the gas source 30. Upon contact with generated gas 98 at time $T_3$, the pressure of the stored gas 100 increases. The pressure of the stored gas 100 is increased to a greater extent than obtains in FIG. 8a, when the generated gas 98 enters the first portion 28 of gas source 30 at time $T_2$. The largest amount of stored gas is present within the first portion 28 of gas source 30 when gas 98 enters the first portion 28 at time $T_1$. Accordingly, the pressure of the stored gas within the first portion 28 of gas source 30 is highest in FIG. 8c.

The air cushion will, of course, be inflated during the shortest time interval when, as shown in FIG. 8c, gas is simultaneously released from the first portion 28 and the second portion 36 of gas source 30. As the time interval between release of gas from first portion 28 and second portion 36 increases, the pressure of gas released from source 30 decreases and the time interval during which an air cushion is inflated with gas from source 30 is increased. The transmission control of apparatus 10 cooperates with gas source 30 to make the time interval during which the air cushion is inflated inversely proportionate to the impact velocity of a vehicle in which apparatus 10 is disposed. During low speed impact of a vehicle carrying apparatus 10, the time interval during which current 20 travels from impact detector 24 through transmission circuit 32 to gas source 30 is increased. The air cushion inflates during a longer time interval; passengers or other mobile objects stationed relatively near portions of a vehicle from which an air cushion inflates will be pushed backward with less force as the air cushion is filled. At higher impact velocities, the time interval during which current 20 travels from impact detector through transmission circuit 32 to the second portion 36 of gas source 30 is proportionately reduced, and the air cushion is inflated during a shorter time interval. The preselected pressure at which gas can be released from apparatus 10 will depend on many factors, including the volume and construction of the air cushion, and the weight of an occupant or mobile object. Such factors can be controlled by auxiliary means known to those skilled in the art. For substantially any impact velocity, sound, rebound, and other problems resulting from inflation of air cushions during shorter time intervals than those best suited to protect the occupant can be eliminated.

The apparatus disclosed is relatively simple in construction, and is easily fabricated and installed. No difficulty has been encountered with respect to the ability of apparatus 10 to uniformly detect the velocity of the vehicle upon impact. When employed to detect angular impacts, for example, the apparatus accurately determined the impact velocity of the vehicle and caused the bag to be filled with gas during the time interval previously selected for that velocity.

Having thus described my invention in rather full detail, it will be understood that these details need not be strictly adhered to but that various changes and modifications may suggest themselves to one skilled in the art. It is accordingly intended that all matter contained in the above description and shown in the accompanying drawings shall be interpreted as illustrative and not in a limiting sense.

I claim:

1. A vehicle occupant restraint system comprising, in combination, source means actuatable to provide first and second volumes of pressure fluid, an occupant restraint cushion inflatable from said source means, control means for actuating said source means to release said first and second volumes of pressure fluid in response to an impact above a predetermined minimum intensity, said control means including time delay means to sequentially release said second volume of pressure fluid after said first volume of pressure fluid, whereby said first and second volumes are released either sequentially in response to lower levels of intensity above said predetermined minimum intensity or substantially simultaneously in response to a predetermined higher level of intensity above said lower levels of intensity.

2. Apparatus for transmitting an electrical current to a gas source disposed in a vehicle comprising:
   a. a power source for supplying the current;
   b. first circuit means for transmitting the current from the power source to a first portion of the gas source during a first time interval;
   c. second circuit means for transmitting the current from the power source to a second portion of the gas source during a second time interval;
   d. means for causing the current to pass through said first and second circuit means in a variable time differential upon impact of the vehicle dependent on the velocity of the vehicle.

3. Apparatus for transmitting an electrical current to a gas source disposed in a vehicle, within a time interval which varies in inverse proportion to the impact velocity of the vehicle, comprising:
   a. a power source for supplying the current;
   b. first circuit means for transmitting the current from the power source to a first portion of the gas source during a first time interval;
   c. second circuit means for transmitting the current from the power source to a second portion of the gas source during a second time interval;
   d. impact detecting means for causing the current to pass through said first and second circuit means upon impact of the vehicle; and
   e. control means associated with the impact detecting means and responsive to the impact velocity of the vehicle, for varying the second time interval in inverse proportion to the velocity of the vehicle upon impact.

4. Apparatus as recited in claim 3, wherein the impact detecting means comprises a moveable electroconductive material connected to said power source and means for displacing said material against a preselected resisting force and into contact with an electroconductive member connected to said first circuit means.

5. Apparatus as recited in claim 4, wherein the control means comprises a plurality of control elements individually mounted at separate locations on the vehicle and connected to the impact detecting means, each control element having means for increasing the second time interval by a different preselected period of time.

6. Apparatus as recited in claim 5 wherein each of said control elements comprises a moveable electroconductive material connected to said power source and means for displacing said electroconductive material against a preselected resisting force and into contact with a resistance material connected to the second circuit means, the resisting force against which the electroconductive material is displaced differing for a substantial number of the control elements and having a greater magnitude than the resisting force against which the electroconductive material of the impact detecting means is displaced, the resistance material having a preselected resistance which differs for a substantial number of the control elements and varies in inverse proportion to the resisting force.

7. Apparatus as recited in claim 4, wherein the control means includes a resistance element connected to the second circuit means and means for displacing the electroconductive material against the resisting force and into contact with a variable portion of the resistance element, the portion contacted varying in direct proportion to the distance that the electroconductive material is displaced by forces resulting from impact of the vehicle.

8. Apparatus as recited in claim 7, wherein the control means includes means for holding the electroconductive material in contact with a preselected portion of the resistance element for at least the time interval during which the current from the power source is transmitted to the second portion of the gas source.

9. Apparatus as recited in claim 7, wherein said first and second circuit means include a firing circuit connected to the power source and to the impact detecting means, said firing circuit means comprising means for detecting and visually indicating a loss of pressure within the gas source.

10. Apparatus as recited in claim 9, wherein a pressure switch is held in circuit with a first lamp by the pressure of gas within the gas source.

11. Apparatus as recited in claim 10, wherein a second lamp connected in parallel with the first lamp and with the power source is placed in circuit with the power source by loss of pressure from the gas source.

12. Apparatus as recited in claim 11, wherein a light sensitive switch having a lower resistance than the first lamp is connected in parallel to the second lamp and activated by light from the first lamp.

13. Apparatus as recited in claim 12, wherein a capacitor is connected in parallel with the power source to supply auxiliary current to the first and second circuit means.

14. Apparatus as recited in claim 13, wherein a first diode is connected in series with the pressure switch and the capacitor to prevent discharge of the capacitor through the pressure switch.

15. Apparatus as recited in claim 14, wherein a second diode is connected in series with the pressure switch and located in the firing circuit between the capacitor and the impact detector.

16. Apparatus as recited in claim 15, wherein said first and second diodes each comprise redundant diodes connected in parallel.

17. Apparatus as recited in claim 7, wherein the first portion of the gas source comprises an enclosed gas containing means filled with a pressurized gas and provided with an inlet and outlet means; and the second portion of the gas source comprises an enclosed gas generating means, disposed adjacent to the gas containing means and separated therefrom by a pressure sensitive barrier.

18. Apparatus as recited in claim 17, wherein the outlet means is in communication with an inflatable bag, whereby upon impact of the vehicle a gas stream comprising the pressurized gas and preselected portions of the generated gas flows from the gas containing means into the inflatable bag.

19. Apparatus as recited in claim 7, including means for transmitting the current from the power source to the second portion of the gas source upon contact of the electroconductive material with the resistance element, the time interval for said transmission being independent of the time interval during which the electroconductive material contacts the resistance element.

20. Apparatus as recited in claim 7, including switch means adjacent the resistance element, for transmitting current from the power source to the transmission circuit for a time interval independent of the time interval during which the electroconductive material contacts the resistance element.

21. Apparatus as recited in claim 3, wherein said control means comprises a variable resistor and the second circuit means includes a transmission circuit, connected to the impact detecting means, said transmission circuit comprising the variable resistor in series with means for transmitting an electrical pulse to the second portion of the gas source.

22. Apparatus as recited in claim 21, wherein the electrical pulse is transmitted by means which include a unijunction transistor and a rectifier in series with the resistor and a bridge wire within the second portion of the gas source, and a capacitor connected in parallel with the power source.

* * * * *